(12) United States Patent
Yu et al.

(10) Patent No.: US 8,557,440 B2
(45) Date of Patent: Oct. 15, 2013

(54) POSITIVE ELECTRODE ACTIVE MATERIAL INCLUDING PARTICLE COMPRISING CRYSTAL STRUCTURE CHANGING FROM A LAYERED STRUCTURE TO A SPINEL STRUCTURE, METHOD OF MANUFACTURING THE POSITIVE ELECTRODE ACTIVE MATERIAL, AND NON-AQUEOUS ELECTROLYTE SECONDARY BATTERY USING THE POSITIVE ELECTRODE ACTIVE MATERIAL

(75) Inventors: Denis Yau Wai Yu, Kobe (JP); Katsunori Yanagida, Kobe (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 463 days.

(21) Appl. No.: 12/895,132

(22) Filed: Sep. 30, 2010

(65) Prior Publication Data
US 2011/0076564 A1 Mar. 31, 2011

(30) Foreign Application Priority Data

Sep. 30, 2009 (JP) ................................. 2009-227944
May 17, 2010 (JP) ................................. 2010-112860

(51) Int. Cl.
*H01M 4/485* (2010.01)
*H01M 4/505* (2010.01)
*H01M 4/525* (2010.01)
*C01D 1/02* (2006.01)

(52) U.S. Cl.
USPC ................ 429/231.1; 429/231.3; 429/231.95; 429/223; 429/224; 252/182.1; 423/594.6

(58) Field of Classification Search
USPC ........... 429/231.1, 224, 329, 331, 223, 231.3, 429/231.95; 252/182.1; 423/594.6
See application file for complete search history.

(56) References Cited

U.S. PATENT DOCUMENTS 6,306,542 B1 * 10/2001 Nakano et al. ................ 429/224
2007/0134558 A1 * 6/2007 Fukunaga et al. ............ 429/329

(Continued)

FOREIGN PATENT DOCUMENTS

JP 08/007883 A * 1/1996 ............. H01M 4/02
JP 2000-164214 A 6/2000

(Continued)

OTHER PUBLICATIONS

"Olivine Composite Cathode Materials for Improved Lithium Ion Battery Performance", Ward et al., U.S. Department of Energy Journal of Undergraduate Research, p. 91-96, 2006. Retrieved online on Mar. 20, 2013 from: http://www.osti.gov/bridge/servlets/purl/1051809/1051809.pdf.*

(Continued)

*Primary Examiner* — Kenneth Douyette
(74) *Attorney, Agent, or Firm* — Westerman, Hattori, Daniels & Adrian, LLP

(57) ABSTRACT

A positive electrode active material having a lithium-excess lithium-transition metal composite oxide particle represented by the chemical formula $Li_{1.2}Mn_{0.54}Ni_{0.13}Co_{0.13}O_2$. The lithium-excess lithium-transition metal composite oxide particle has an inner portion (1) having a layered structure and a surface adjacent portion (2) having a crystal structure gradually changing from a layered structure to a spinel structure from the inner portion (1) toward the outermost surface portion (3). The layered structure and the spinel structure have an identical ratio of the amount of Mn and the total amount of Ni and Co.

6 Claims, 6 Drawing Sheets

(56) References Cited

U.S. PATENT DOCUMENTS

2009/0011335 A1 1/2009 Takeda et al.
2009/0272939 A1* 11/2009 Sun et al. .................. 252/182.1

FOREIGN PATENT DOCUMENTS

| JP | 2006-012426 A | 1/2006 |
| JP | 2009-004285 A | 1/2009 |
| JP | 2009-129721 A | 6/2009 |
| JP | 2009-146739 A | 7/2009 |

OTHER PUBLICATIONS

"A manganese oxyiodide cathode for rechargeable lithium batteries", Kim et al., Nature, vol. 390, Nov. 20, 1997. p. 265-267.*

"Metastable Intermediate in LixMnO2 Layered to Spinel Phase Transition", Reed et al., Oct. 28, 2001, p. 1-11. Retrieved online on Mar. 20, 2013 from: http://dspace.mit.edu/bitstream/handle/1721.1/3980/AMMNS015.pdf?sequence=2.*

Machine Translation of: JP 08/007883, Sekai et al., Jan. 12, 1996.*

Wu, Y et al. "High Capacity, Surface-Modified Layered Li[Li(1-x)/3Mn(2-x)/3Nix/3Cox/3]O2 Cathodes with Low Irreversible Capacity Loss," Electrochemical and Solid-State Letters, Mar. 2, 2006, pp. A221-A224, vol. 9 No. 5.

Kang, Sun-Ho et al. "Enhancing the rate capability of high capacity xLi2MnO3-(1-x)LiMO2 (M=Mn, Ni, Co) electrodes by Li-Ni-PO4 treatment," Electrochemistry Communications, Jan. 29, 2009, pp. 748-751, vol. 11.

Kang, S.-H. et al. "The Effects of Acid Treatment on the Electrochemical Properties of 0.5 Li2MnO3-0.5 LiNi0.44Co0.25Mn0.3102 Electrodes in Lithium Cells," Journal of the Electrochemical Society, Apr. 20, 2006, pp. A1186-A1192, vol. 153 No. 6.

Hwang, Seong-Ju et al. "Micro-Raman Spectroscopic Study on Layered Lithium Manganese Oxide and Its Delithiated/Relithiated Derivatives," Electrochemical and Solid-State Letters, Oct. 15, 2001, pp. A213-A216, vol. 4 No. 12.

Kang, S.H. et al "Stabilization of xLi2MnO3*(1-x)LiMO2, Electrode Surfaces (M=Mn, Ni, Co) with Mildly Acidic, Fluorinated Solutions," The Journal of the Electrochemical Society, Jan. 31, 2008, pp. A269-A275, vol. 155 No. 4.

Wu, Y et al. "Surface Modification of High Capacity Layered Li[Li02Mn0.54Ni0.13Co0.13]O2 Cathodes by AlPO4," The Journal of the Electrochemical Society, Jul. 11, 2008, pp. A635-A641, vol. 155 No. 9.

Kang, Y.-J. et al. "The effect of Al(OH)3 coating on the Li[Li02Ni0.2Mn0.6]O2 cathode material for lithium secondary battery," Electrochimica Acta, Apr. 8, 2005, pp. 4784-4791, vol. 50.

* cited by examiner

POSITIVE ELECTRODE ACTIVE MATERIAL INCLUDING PARTICLE COMPRISING CRYSTAL STRUCTURE CHANGING FROM A LAYERED STRUCTURE TO A SPINEL STRUCTURE, METHOD OF MANUFACTURING THE POSITIVE ELECTRODE ACTIVE MATERIAL, AND NON-AQUEOUS ELECTROLYTE SECONDARY BATTERY USING THE POSITIVE ELECTRODE ACTIVE MATERIAL

BACKGROUND OF THE INVENTION

1. Field of the Invention

The present invention relates to a positive electrode active material that can improve battery performance such as high-rate capability, a method of manufacturing the positive electrode active material, and a non-aqueous electrolyte secondary battery using the positive electrode active material.

2. Description of Related Art

Mobile information terminal devices such as mobile telephones, notebook computers, and PDAs have become smaller and lighter at a rapid pace in recent years. This has led to a demand for higher capacity batteries as the drive power source for the mobile information terminal devices. With their high energy density and high capacity, non-aqueous electrolyte secondary batteries, which perform charge and discharge by transferring lithium ions between the positive and negative electrodes, have been widely used as a driving power source for the mobile information terminal devices.

As the mobile information terminal devices tend to have greater numbers of functions, such as moving picture playing functions and gaming functions, the power consumption of the devices tends to increase. It is therefore strongly desired that the non-aqueous electrolyte secondary batteries used for the power sources of such devices have further higher capacities and higher performance to achieve longer battery life and improved output power. In addition, applications of the non-aqueous electrolyte secondary batteries are expected to expand from not just the above-described applications but to power tools, power assisted bicycles, and moreover HEVs. In order to meet such expectations, it is strongly desired that the capacity and the performance of the battery be improved further.

In order to increase the capacity of the non-aqueous electrolyte secondary battery, it is essential to increase the capacity of the positive electrode. A lithium-excess lithium-transition metal composite oxide represented by the chemical formula $Li_{1+x}Mn_{1-x-y}M_yO_2$, where M is at least one transition metal other than manganese, has been proposed as a positive electrode material. This material is known to show a high discharge capacity, a maximum of 270 mAh/g. (See Electrochemical and Solid-State Letters 9(5), A221-A224, (2006).) The just-mentioned oxide, however, has limited practical applications because it is poor in high-rate capability, cycle performance, initial charge-discharge efficiency, and the like. It is generally known that the high-rate capability is affected by the lithium diffusion rate in the bulk and the smoothness of lithium insertion and deinsertion in the particle surface. It appears, therefore, conceivable that the high-rate capability may be improved by reducing the particle size of the positive electrode active material so that the diffusion distance in the particle can decrease. However, when the particle size is reduced, another problem arises that the packing density of the positive electrode active material decreases and consequently the energy density decreases.

In view of such circumstances, the following proposals have been made.

Proposal (1): Using a lithium-excess lithium-transition metal composite oxide the surface of which is coated with $Al_2O_3$ or $LiNiPO_4$ as the positive electrode active material (see Electrochemical and Solid-State Letters, 9(5), A221-A224 (2006) and Electrochemistry Communications, 11(4), pp. 748-751 (2009)).

Proposal (2): Coating the surface of a positive electrode active material having a layered structure with a positive electrode active material having a spinel structure such as $LiMn_2O_4$ (see Japanese Published Unexamined Patent Application No. 2009-129721).

Proposal (3): Acid-treating a lithium-excess lithium-transition metal composite oxide using an acid such as $HNO_3$ to remove excess lithium from the positive electrode active material, in order to modify the surface of the active material (see Journal of The Electrochemical Society 153(6), A1186-A1192, (2006)).

Proposal (4): Dry-blending a nickel-based positive electrode active material and $(NH_4)_2SO_4$ and thereafter heat-treating the material at 700° C. (see Japanese Published Unexamined Patent Application No. 2009-146739).

Problem with Proposal (1)

According to proposal (1), the cycle performance may be improved somewhat. However, since the positive electrode active material having a spinel structure does not exist on the surface, the high-rate capability becomes poor, or even if improved, significant improvement is impossible.

Problem with Proposal (2)

According to proposal (2), the positive electrode active material having a layered structure in the inside and the positive electrode active material having a spinel structure on the outside have different structures from each other, and moreover, the compositions of the positive electrode active materials are also different from each other. As a consequence, a boundary forms between the positive electrode active material in the inside and the positive electrode active material on the surface, and this boundary limits the diffusion of lithium in the positive electrode active material particle. For this reason, it is impossible to improve the high-rate capability dramatically.

Problem with Proposal (3)

According to proposal (3), the initial charge-discharge efficiency can be improved by the effect of modifying the positive electrode active material surface. However, since the positive electrode active material surface is damaged by the acid, the cycle performance degrades.

Problem with Proposal (4)

When proposal (4) is applied to a manganese-based positive electrode active material such as that in the present invention, a decrease in discharge capacity and degradations in charge-discharge efficiency and high-rate capability occur because of the different in the structure of the positive electrode active material and the high heating temperature.

BRIEF SUMMARY OF THE INVENTION

In view of the foregoing and other problems, it is an object of the present invention to provide a positive electrode active material, a method of manufacturing the positive electrode active material, and a battery using the positive electrode active material that can significantly improve various battery characteristics, such as high-rate capability, charge-discharge efficiency, and discharge capacity while preventing the energy density from decreasing.

In order to accomplish the foregoing and other objects, the present invention provides a positive electrode active material comprising: a lithium-excess lithium-transition metal composite oxide particle represented by the chemical formula $Li_{1+x-s}Mn_{1-x-y}M_yO_{2-t}$, where $0<x<0.33$, $0<y<0.66$, $0<s<0.3$, $0<t<0.15$, and M is at least one transition metal other than manganese; and the lithium-excess lithium-transition metal composite oxide particle comprising an inner portion having a layered structure and a surface adjacent portion having a crystal structure gradually changing from a layered structure to a spinel structure from an inner part thereof toward a surface part thereof, and the layered structure and the spinel structure having an identical ratio of the Mn and the M in the chemical formula.

The layered structure and the spinel structure are compatible with each other, with the same oxygen arrangement but are different only in their lithium and transition metal atom arrangements. For this reason, it is possible to coat the surface of the positive electrode active material having a layered structure with the positive electrode active material having a spinel structure as disclosed in the above-described proposal (2). However, if a boundary forms between the positive electrode active material having a layered structure and the positive electrode active material having a spinel structure, high-rate capability cannot be improved significantly because the diffusion of lithium in the positive electrode active material particle is limited.

With the just-described configuration in which the inner portion has a layered structure and the surface adjacent portion has a crystal structure gradually changing from a layered structure to a spinel structure from the inner part to the surface part, no clear boundary forms between the positive electrode active material contained in the inner portion and the positive electrode active material contained in the surface portion. As a result, lithium diffusion takes place smoothly within the positive electrode active material particle, and lithium insertion and deinsertion in the positive electrode active material particle occur easily. Moreover, since the layered structure and the spinel structure have an identical ratio of Mn and M (hereinafter also referred to as the "Mn/M ratio"), the boundary between the positive electrode active material disposed in the inner portion and that disposed in the surface portion is prevented from forming more effectively. For these reasons, high-rate capability is significantly improved in the battery using the positive electrode active material with the above-described configuration.

In addition, since the particle size of the positive electrode active material is not limited, the decrease in energy density resulting from reducing the particle size of the positive electrode active material is prevented. Furthermore, the problems of the decrease in discharge capacity and the deterioration in charge-discharge efficiency caused by high-temperature heating are also avoided.

It is desirable that the ratio of the diameter of the portion having a layered structure to the diameter of the positive electrode active material particle be from 0.6 to 0.998. If the ratio exceeds 0.998, the crystal structure does not change into a spinel structure sufficiently in the surface adjacent portion of the positive electrode active material particle, and consequently, high-rate capability may not be improved sufficiently. On the other hand, if the ratio is less than 0.6, the portion having a layered structure is too small in size, and consequently, various problems arise such as the discharge capacity lowers and the charge-discharge efficiency exceeds 100%.

It should be noted that the value s and the value in the formula are the values in the entire positive electrode active material particle, and portions nearer to the surface of the positive electrode active material particle have greater values s and t. The reason is that more oxygen and lithium are extracted as the crystal structure changes from a layered structure to a spinel structure.

It is desirable that the lithium-excess lithium-transition metal composite oxide particle be represented by the chemical formula $Li_{1+x-s}Mn_{1-x-p-q}Ni_pCo_qA_rO_{2-t}$, where $0<x<0.33$, $0<p<0.5$, $0<q<0.33$, $0\leq r<0.05$, $0<s<0.3$, $0<t<0.15$, and A is Mg, Zr, or Nb. It is also desirable that the lithium-excess lithium-transition metal composite oxide particle have a Raman intensity ratio $[I(635)/I(605)]$ in the range $0.6<I(635)/I(605)<1.5$. It is also desirable that the inner portion having a layered structure contain at least a structure belonging to the space group C2/m or C2/c.

With these configurations, lithium diffusion takes place more smoothly within the positive electrode active material particle. In addition, lithium insertion and deinsertion in the positive electrode active material particle occur more easily. As a result, the above-described advantageous effects are exhibited more significantly.

It is desirable that the positive electrode active material comprise a protective layer formed on the surface of the lithium-excess lithium-transition metal composite oxide particle.

The positive electrode active material may cause deterioration in cycle performance because the transition metals dissolve away and the positive electrode active material deteriorates as the charge-discharge operations are repeated. However, when the protective layer is formed on the surfaces of the particles as described above, the transition metals are prevented from dissolving away even if the charge-discharge operations are repeated. As a result, the positive electrode active material is inhibited from deterioration, and the cycle performance is improved.

The invention also provides a method of manufacturing a positive electrode active material, comprising: a first step of immersing particles of a lithium-excess lithium-transition metal composite oxide in an aqueous solution containing a first reducing agent, the lithium-excess lithium-transition metal composite oxide represented by the chemical formula $Li_{1+x-s}Mn_{1-x-y}M_yO_{2-t}$, where $0<x<0.33$, $0<y<0.66$, $0<s<0.3$, $0<t<0.15$, and M is at least one transition metal other than manganese; and a second step of heat-treating the lithium-excess lithium-transition metal composite oxide particles at a temperature of from 200° C. to 500° C. while the solution containing the first reducing agent is adhering to the lithium-excess lithium-transition metal composite oxide particles.

The just-described method enables the manufacture of the foregoing positive electrode active material. That is, when the lithium-excess lithium-transition metal composite oxide particles are heat-treated while the first reducing agent is adhering thereto, the first reducing agent is decomposed, and while this decomposition is taking place, the lithium and oxygen are extracted from the bulk material and the particle surface is changed into a spinel structure by appropriate application of heat. In this case, lithium and oxygen are extracted only from the surface adjacent portion of the positive electrode active material particle, and they are especially extracted in a large amount from the outermost surface portion of the positive electrode active material particle. Therefore, in the surface adjacent portion of the positive electrode active material particle, the crystal structure gradually changes from the layered structure to the spinel structure from the inner part toward the surface part, and no clear boundary forms between the two structures. As a result, lithium diffusion takes place smoothly within the positive electrode active material particle, and lithium insertion and deinsertion also occur easily in the positive electrode active material particle. As a result, the high-rate capability is improved. Moreover, with this manufacturing method, lithium is partially removed from positive electrode active material, so the initial charge-discharge efficiency can be improved to nearly 100%. Furthermore, since merely lithium and oxygen atoms are extracted from the bulk material so that the surface portion changes into a spinel structure, the amount of metal ions in the surface adjacent region of the positive electrode active material does not change by the reaction with the first reducing agent (i.e., the Mn/M ratio is identical in any portion of the positive electrode active material particle).

The temperature of the heat-treating is restricted to 200° C. to 500° C. for the following reason. If the temperature is less than 200° C., the just-mentioned decomposition of the first reducing agent does not occur. On the other hand, if the temperature exceeds 500° C., oxygen absorption into the positive electrode active material particle is promoted, and the discharge capacity is degraded.

It is desirable that the lithium-excess lithium-transition metal composite oxide particle be represented by the chemical formula $Li_{1+x-s}Mn_{1-x-p-q}Ni_pCo_qA_rO_{2-t}$, where $0<x<0.33, 0<p<0.5, 0<q<0.33, 0\leq r<0.05, 0<s<0.3, 0<t<0.15$, and A is Mg, Zr, or Nb.

It is desirable that in the second step, the heat-treating is performed at a temperature within the range of from 250° C. to 400° C.

When the heating temperature is restricted to the above-described range, the decomposition reaction with the first reducing agent is caused more smoothly, and the oxygen absorption into the positive electrode active material particle is inhibited more effectively. As a result, the discharge capacity is inhibited more sufficiently from decreasing.

It is desirable that the first reducing agent be at least one phosphate salt selected from the group consisting of $NH_4H_2PO_4$, $(NH_4)_2HPO_4$, and $H_3PO_4$. In particular, it is desirable that amount of the first reducing agent be from 1 mass % to 5 mass % with respect to the total amount of the lithium-excess lithium-transition metal composite oxide particles.

When a phosphate salt is used as the first reducing agent as in the above-described configuration, $Li_3PO_4$ is produced on the surface of the positive electrode active material particle as a residue, and the $Li_3PO_4$ cannot be easily removed because it is not water-soluble. Thus, the $Li_3PO_4$ serves as the protective layer on the surface of the positive electrode active material particle. Therefore, transition metal atoms are prevented from dissolving away from the positive electrode active material even when the charge-discharge operations are repeated. As a result, the cycle performance is improved. Nevertheless, if the amount of the first reducing agent with respect to the total amount of the lithium-excess lithium-transition metal composite oxide particles (hereinafter also referred to simply as "the amount of the first reducing agent") exceeds 5 mass %, the discharge capacity may decrease because the amount of the remaining $Li_3PO_4$ is too large, the relative proportion of the positive electrode active material decreases, and the thickness of the protective layer becomes too large. On the other hand, if the amount of the first reducing agent is less than 1 mass %, the crystal structure does not change sufficiently into a spinel structure in the surface adjacent portion of the positive electrode active material particle, the high-rate capability may not be improved sufficiently. For these reasons, it is desirable that the amount of the first reducing agent be from 1 mass % to 5 mass % when a phosphate salt is used as the first reducing agent.

It is desirable that the first reducing agent be diammonium citrate or ascorbic acid. In particular, it is desirable that amount of the first reducing agent be from 1 mass % to 10 mass % with respect to the total amount of the lithium-excess lithium-transition metal composite oxide particles.

The amount of the first reducing agent is restricted for the same reason as in the above-described case of using a phosphate salt as the first reducing agent.

It is desirable that the first reducing agent be $(NH_4)_2SO_4$. In particular, it is desirable that amount of the first reducing agent be from 1 mass % to 20 mass % with respect to the total amount of the lithium-excess lithium-transition metal composite oxide particles.

The amount of the first reducing agent is restricted to be 1 mass % or greater for the same reason as in the above-described case of using a phosphate salt as the first reducing agent. The amount of the first reducing agent is restricted to be 20 mass % or less for a different reason from the above-described case of using a phosphate salt as the first reducing agent. When $(NH_4)_2SO_4$ is used as the first reducing agent, $Li_2SO_4$ is produced on the particle surface as a residue. This residue can be easily removed because it is water-soluble. Accordingly, the problem of the decrease in discharge capacity resulting from the protective layer having too large a thickness does not arise. However, the upper limit is specified for the following reason. If the amount of the first reducing agent exceeds 20 mass %, the reaction amount becomes too large, making the portion having a layered structure too small. As a consequence, the problem can arise that the discharge potential decreases or the initial charge-discharge efficiency exceeds 100%.

It is desirable that the method further comprise, after the second step, a third step of forming a protective layer on the surface of the lithium-excess lithium-transition metal composite oxide particle using a second reducing agent. It is desirable that the second reducing agent be $(NH_4)_2HPO_4$ or $H_3BO_3$.

With such a configuration, transition metal atoms are prevented from dissolving away from positive electrode active material as in the case of using a phosphate salt as the first reducing agent, and therefore, the cycle performance is improved. When the second reducing agent is $(NH_4)_2HPO_4$, a protective layer represented as $Li_3PO_4$ is formed. When the second reducing agent is $H_3BO_3$, a protective layer represented as $B_2O_3$ is formed.

The invention also provides a non-aqueous electrolyte secondary battery comprising a negative electrode, a non-aqueous electrolyte, and a positive electrode containing any one of the foregoing positive electrode active materials.

The present invention achieves improvements in high-rate capability and charge-discharge efficiency and an increase in discharge capacity, while preventing the energy density from decreasing.

DETAILED DESCRIPTION OF THE INVENTION

Figure 1:
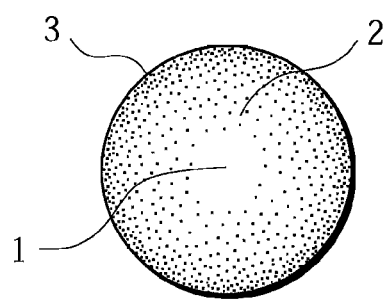
FIG. 1 is a view illustrating the structure of a positive electrode active material particle according to the present invention.

Hereinbelow, preferred embodiments of the non-aqueous electrolyte secondary battery according to the invention will be described with reference to FIGS. 1 through 4. It should be construed, however, that the non-aqueous electrolyte secondary battery according to this invention is not limited to the following embodiments and examples but various changes and modifications are possible without departing from the scope of the invention.

First, a Mn, Co, and Ni composite hydroxide was prepared by mixing a Mn salt, a Co salt, and a Ni salt together at a desired stoichiometric ratio and using a coprecipitation method. The resultant hydroxide and lithium hydroxide (LiOH) were formed into pellets and sintered in the air at 900° C. for 24 hours, to obtain particles of a lithium-excess lithium-transition metal composite oxide represented as $Li_{1.20}Mn_{0.54}Ni_{0.13}Co_{0.13}O_2$. Next, the composite oxide particles were immersed in a $NH_4H_2PO_4$ aqueous solution so that the proportion of $NH_4H_2PO_4$ (the first reducing agent) with respect to the total amount of the composite oxide particles (this proportion is hereafter also simply referred to as the proportion of $NH_4H_2PO_4$, likewise in the later-described cases of using other first reducing agents) became 1 mass %, whereby $NH_4H_2PO_4$ serving as the first reducing agent was adhered to the surfaces of the composite oxide particles, and the resultant particles were dried at 80° C. (the first step). Next, the composite oxide particles on the surfaces of which $NH_4H_2PO_4$ was adhered were heat-treated at 300° C. for 5 hours (the second step).

Thereafter, the lithium-excess lithium-transition metal composite oxide particles subjected to the just-described treatment, as the positive electrode active material, acetylene black as a conductive agent, and polyvinylidene fluoride (PVdF) as a binder agent were mixed together at a mass ratio of 80:10:10, and an appropriate amount of NMP solution was added to the mixture to control the viscosity, to thus prepare a positive electrode slurry. Subsequently, the resultant positive electrode slurry was applied at a predetermined thickness onto an aluminum foil by a coater, and thereafter dried at 80° C. using a hot plate. Thus, a positive electrode was prepared.

The just-described positive electrode and a negative electrode made of metallic lithium were disposed with a separator interposed therebetween to prepare an electrode assembly. Thereafter, the electrode assembly and an electrolyte solution were placed in a battery case, and the battery case was sealed, whereby a test cell was prepared. The electrolyte solution used was prepared as follows. Lithium hexafluorophosphate ($LiPF_6$) was dissolved at a concentration of 1 mole/L in a mixed solvent of 3:7 volume ratio of ethylene carbonate (EC) and diethyl carbonate (DEC).

EXAMPLES

First Group of Examples

Example A 1

A test cell was prepared according to the same manner as described in the foregoing embodiment.

The test cell prepared in this manner is hereinafter referred to as a present invention cell A1.

Examples A2 to A4

Cells were fabricated in the same manner as described in Example A1 above, except that, when preparing the positive electrode active material, the proportions of $NH_4H_2PO_4$ were set at 2 mass %, 5 mass %, and 10 mass %, respectively.

The cells fabricated in these manners are hereinafter referred to as present invention cells A2 to A4, respectively.

Example B

A cell was fabricated in the same manner as described in Example A1 above, except that, when preparing the positive electrode active material, $H_3PO_4$ was used as the first reducing agent in place of $NH_4H_2PO_4$ and that the proportion of the $H_3PO_4$ was set at 5.1 mass %.

The cell fabricated in this manner is hereinafter referred to as the present invention cell B.

Examples C1 to C3

Cells were fabricated in the same manner as described in Example A1 above, except that, when preparing the positive electrode active material, $(NH_4)_2HPO_4$ was used as the first reducing agent in place of $NH_4H_2PO_4$ and that the proportions of the $(NH_4)_2HPO_4$ were set at 2 mass %, 5 mass %, and 10 mass %, respectively.

The cells fabricated in these manners are hereinafter referred to as present invention cells C1 to C3, respectively.

Examples D1 to D4

Cells were fabricated in the same manner as described in Example A1 above, except that, when preparing the positive electrode active material, $(NH_4)_2SO_4$ was used as the first reducing agent in place of $NH_4H_2PO_4$, that the proportions of the $(NH_4)_2SO_4$ were set at 2 mass %, 5 mass %, 10 mass %, and 20 mass %, respectively, and that the positive electrode active material particles were washed with water after the heat treatment.

The cells fabricated in these manners are hereinafter referred to as present invention cells D1 to D4, respectively.

Example D5

A cell was fabricated in the same manner as described in Example A1 above, except that, when preparing the positive electrode active material, $(NH_4)_2SO_4$ was used as the first reducing agent in place of $NH_4H_2PO_4$, that the proportion of the $(NH_4)_2SO_4$ was set at 15 mass %, and that the positive electrode active material particles were washed with water after the heat treatment.

The cell fabricated in this manner is hereinafter referred to as a present invention cell D5.

Examples E1 and E2

Cells were fabricated in the same manner as described in Example A1 above, except that, when preparing the positive electrode active material, diammonium citrate [$(NH_4)_2HC_6H_5O_2$] was used as the first reducing agent in place of $NH_4H_2PO_4$ and that the proportions of the diammonium citrate were set at 5 mass % and 10 mass %, respectively.

The cells fabricated in these manners are hereinafter referred to as present invention cells E1 and E2, respectively.

Examples F1 and F2

Cells were fabricated in the same manner as described in Example A1 above, except that, when preparing the positive electrode active material, ascorbic acid [$C_6H_8O_6$] was used as the first reducing agent in place of $NH_4H_2PO_4$ and that the proportions of the ascorbic acid were set at 5 mass % and 10 mass %.

The cells fabricated in these manners are hereinafter referred to as present invention cells F1 and F2, respectively.

Comparative Example Z

A test cell was prepared in the same manner as described in Example A1 above, except that no surface treatment using $NH_4H_2PO_4$ was conducted (i.e., the particles of the lithium-excess lithium-transition metal composite oxide represented as $Li_{1.20}Mn_{0.54}Ni_{0.13}Co_{0.13}O_2$ were used as the positive electrode active material as they were).

The test cell fabricated in this manner is hereinafter referred to as a comparative cell Z.

Comparative Examples Y1 to Y3

Cells were fabricated in the same manner as described in Examples C1 to C3 above, except that, when preparing the positive electrode active material, $(NH_4)_2HPO_4+3LiOH$ was used as the first reducing agent in place of $NH_4H_2PO_4$ [for example, in the case of a comparative cell Y1, which corresponds to the present invention cell D1 with the amount of $(NH_4)_2HPO_4$ being 2 mass %, 2 mass % of $(NH_4)_2HPO_4$ and 1.9 mass % of LiOH—$H_2O$ are contained (i.e., the mole ratio of the $(NH_4)_2HPO_4$ and the LiOH—$H_2O$ is 1:3)].

The cells fabricated in these manners are hereinafter referred to as comparative cells Y1 to Y3, respectively.

Comparative Example X

A test cell was fabricated in the same manner as described in Example A4 above, except that the heat-treating temperature was set at 700° C., not at 300° C.

The test cell prepared in this manner is hereinafter referred to as a comparative cell X.

Comparative Example W

A test cell was fabricated in the same manner as described in Example D1 above, except that $(NH_4)_2SO_4$ in a sold state was added in an amount of 2 mass % to the particles of the lithium-excess lithium-transition metal composite oxide represented as $Li_{1.20}Mn_{0.54}Ni_{0.13}Co_{0.13}O_2$, followed by crushing them finely, and thereafter, the mixture was heat-treated at 700° C. for 5 hours in the air (Note that the positive electrode active material was not washed with water.) It should be noted that the positive electrode active material of this test cell is one prepared in the same method as described in the previously-mentioned Japanese Published Unexamined Patent Application No. 2009-146739.

The test cell prepared in this manner is hereinafter referred to as a comparative cell W.

Comparative Example V

A test cell was fabricated in the same manner as described in Example A1 above, except that the acid treatment described below was conducted as the surface treatment for the lithium-excess lithium-transition metal composite oxide represented as $Li_{1.20}Mn_{0.54}Ni_{0.13}Co_{0.13}O_2$.

The positive electrode active material comprising the just-mentioned metal composite oxide was mixed and stirred in a 1.2N sulfuric acid ($H_2SO_4$) solution for 30 minutes (during this stirring, $H^+$ in the acidic solution is exchanged with $Li^+$ in the active material). Next, the resultant solution was washed with water and thereafter filtered, and the resultant powder was heat-treated at 300° C. for 5 hours in air.

The test cell fabricated in this manner is hereinafter referred to as a comparative cell V.

Experiment 1

Each of the present invention cells A1-A4, B, C1-C3, D1-D4, E1, E2, F1, and F2, as well as the comparative cell Z was charged and discharged under the following conditions to determine the initial discharge capacity (the discharge capacity at the first cycle), the initial charge-discharge efficiency obtained by the following equation (1), the cycle performance obtained by the following equation (2), and the high-rate capability obtained by the following equation (3). The results are shown in Table 1 below.

Initial Charge-Discharge Efficiency $$\text{Initial charge-discharge efficiency}(\%) = [\text{Discharge capacity at the first cycle/Charge capacity at the first cycle}] \times 100 \quad (1)$$

Charge-Discharge Conditions in Initial Charge-Discharge Efficiency Test

Charge conditions

Each of the cells was charged at a constant current with a current density of 20.0 mA/g until the potential of the positive electrode reached 4.8 V (vs. Li/Li$^+$).

Discharge conditions

Each of the cells was discharged at a constant current with a current density of 20.0 mA/g until the potential of the positive electrode reached 2.0 V (vs. Li/Li$^+$).

Cycle Performance $$\text{Cycle performance}(\%) = [\text{Discharge capacity at the 29th cycle/Discharge capacity at the first cycle}] \times 100 \quad (2)$$

Charge-Discharge Conditions in Cycle Performance Test (a) Charge-discharge Conditions for the 1st to the 9th, the 11th to the 19th, and the 21st to the 29th Cycles Charge conditions Each of the cells was charged at a constant current with a current density of 100.0 mA/g until the potential of the positive electrode reached 4.8 V (vs. Li/Li$^+$).

Discharge conditions

Each of the cells was discharged at a constant current with a current density of 100.0 mA/g until the potential of the positive electrode reached 2.0 V (vs. Li/Li$^+$).

(b) Charge-discharge Conditions for the 10th and the 20th Cycles
Charge conditions
Each of the cells was charged at a constant current with a current density of 20.0 mA/g until the potential of the positive electrode reached 4.8 V (vs. Li/Li$^+$).
Discharge conditions
Each of the cells was discharged at a constant current with a current density of 20.0 mA/g until the potential of the positive electrode reached 2.0 V (vs. Li/Li$^+$).
High-Rate Capability High-rate capability(%)=[Discharge capacity at the 2nd cycle/Discharge capacity at the first cycle]× 100     (3)

Charge-Discharge Conditions in High-Rate Capability Test
(a) Charge-Discharge Conditions for the First Cycle
Charge conditions
Each of the cells was charged at a constant current with a current density of 20.0 mA/g until the potential of the positive electrode reached 4.8 V (vs. Li/Li$^+$).
Discharge conditions
Each of the cells was discharged at a constant current with a current density of 10.0 mA/g until the potential of the positive electrode reached 2.0 V (vs. Li/Li$^+$).
(b) Charge-Discharge Conditions for the Second Cycle
Charge conditions
Each of the cells was charged under the same charge conditions as described in (a) above.
Discharge conditions
Each of the cells was discharged at a constant current with a current density of 300.0 mA/g until the potential of the positive electrode reached 2.0 V (vs. Li/Li$^+$).

capacity of 242 mAh/g and an initial charge-discharge efficiency of 75.9%. On the other hand, the present invention cells A1-A4, B, C1-C3, D1-D4, E1, E2, F1, and F2 exhibited initial discharge capacities of from 235.9 mAh/g to 270.4 mAh/g and initial charge-discharge efficiencies of from 75.4% to 96.5%, which are almost the same as or higher than those of the comparative cell Z. This means that the battery characteristics such as the high-rate capability are improved by treating the positive electrode active material with the first reducing agent [NH$_4$H$_2$PO$_4$, H$_3$PO$_4$, (NH$_4$)$_2$HPO$_4$, (NH$_4$)$_2$SO$_4$, diammonium citrate, or ascorbic acid].

Figure 2:
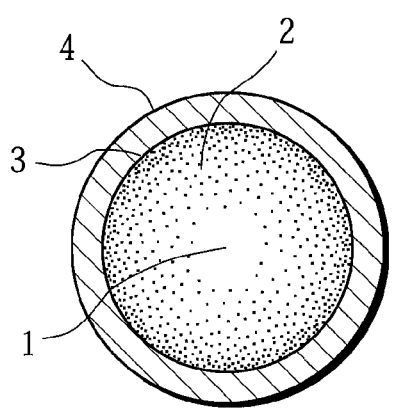
FIG. 2 is a view illustrating the structure of another example of the positive electrode active material particle according to the present invention.

These results are obtained for the following reason. As illustrated in FIGS. 1 and 2, in each of the present invention cells A1-A4, B, C1-C3, D1-D4, E1, E2, F1, and F2, the inner portion 1 has a layered structure (the structure shown in FIG. 3) while the outermost surface portion 3 has a spinel structure (the structure shown in FIG. 4), and the surface adjacent portion 2 has a crystal structure gradually changing from the layered structure to the spinel structure from the inner portion 1 toward the outermost surface portion 3. As a result, no clear boundary forms between the positive electrode active material in the inner portion and the positive electrode active material in the surface portion, and lithium insertion and deinsertion into/from the positive electrode active material particle take place smoothly. On the other hand, in the comparative cell Z, not only the inner portion but also the surface portion has a layered structure (the structure shown in FIG. 3), and consequently, the lithium insertion and deinsertion into/from the positive electrode active material do not take place smoothly.

Figure 3:
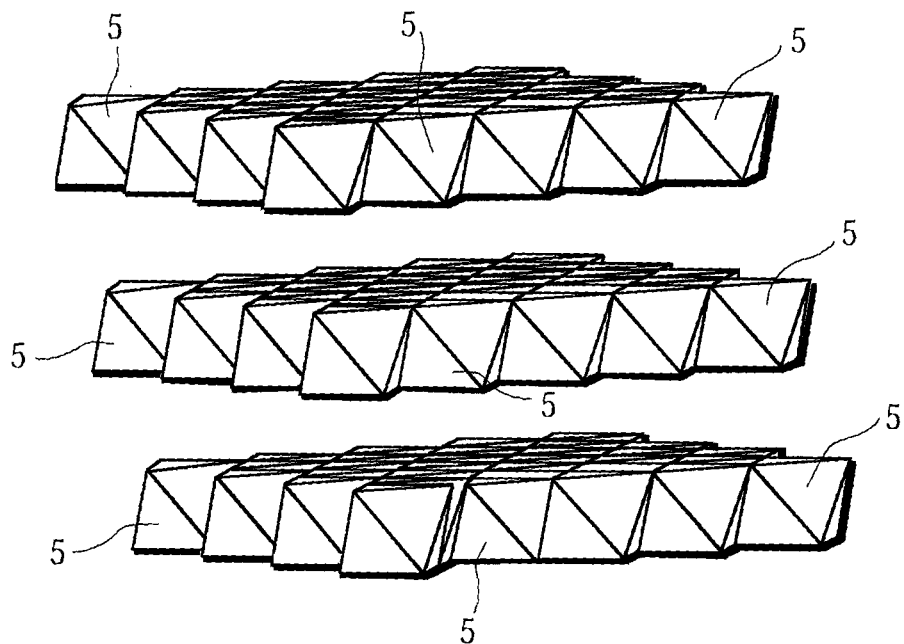
FIG. 3 is a view for illustrating a layered structure.
Figure 4:
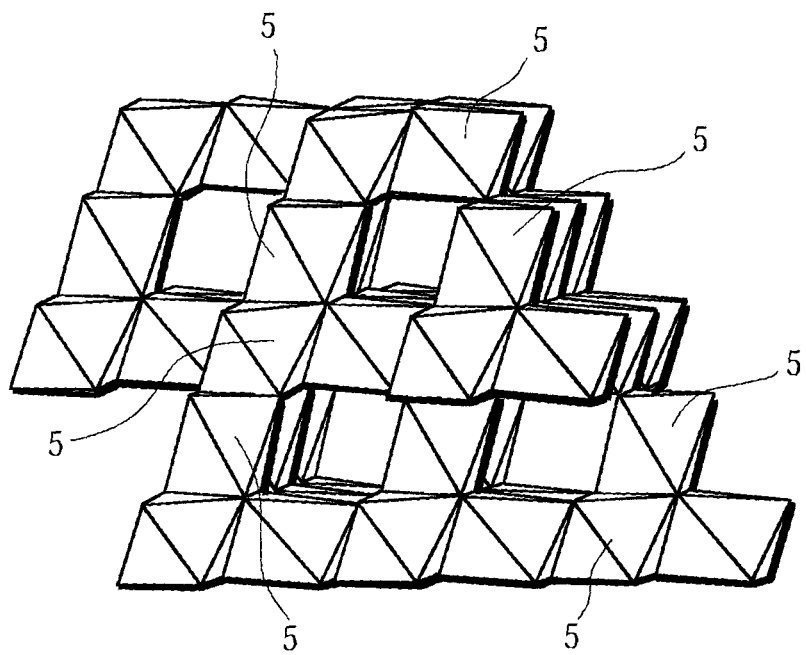
FIG. 4 is a view for illustrating a spinel structure.

In FIGS. 3 and 4, each octahedron 5 represents a transition metal (M) atom surrounded by six oxygen atoms, and lithium

TABLE 1

| Cell | Composition of positive electrode active material | First reducing agent Type | First reducing agent Proportion (%) | Initial discharge capacity (mAh/g) | Initial charge-discharge efficiency (%) | High-rate capability (%) | Cycle performance (%) |
|---|---|---|---|---|---|---|---|
| A1 | Li$_{1.20}$Mn$_{0.54}$Co$_{0.13}$Ni$_{0.13}$O$_2$ | NH$_4$H$_2$PO$_4$ | 1 | 249.0 | 78.1 | 75.5 | 91.5 |
| A2 | | | 2 | 259.5 | 81.7 | 76.1 | 91.7 |
| A3 | | | 5 | 253.7 | 86.3 | 78.5 | 94.4 |
| A4 | | | 10 | 235.9 | 93.9 | 74.8 | 92.4 |
| B | | H$_3$PO$_4$ | 5.1 | 251.4 | 86.3 | 77.5 | — |
| C1 | | (NH$_4$)$_2$HPO$_4$ | 2 | 255.6 | 82.7 | 75.4 | — |
| C2 | | | 5 | 249.0 | 83.0 | 76.7 | — |
| C3 | | | 10 | 242.7 | 89.2 | 75.5 | — |
| D1 | | (NH$_4$)$_2$SO$_4$ | 2 | 261.1 | 80.9 | 76.7 | — |
| D2 | | | 5 | 262.6 | 83.5 | 79.0 | 85.8 |
| D3 | | | 10 | 267.8 | 85.5 | 81.6 | 89.3 |
| D4 | | | 20 | 270.4 | 96.5 | 83.8 | 85.9 |
| E1 | | Diammonium citrate | 5 | 259.8 | 79.9 | 76.0 | — |
| E2 | | | 10 | 251.7 | 76.8 | 76.8 | — |
| F1 | | Ascorbic acid | 5 | 248.3 | 75.4 | 76.6 | — |
| F2 | | | 10 | 244.0 | 75.5 | 77.3 | — |
| Z | | — | | 242.6 | 75.9 | 74.3 | 79.4 |

High-Rate Capability, Initial Discharge Capacity, and Initial Charge-Discharge Efficiency As shown in Table 1, the comparative cell Z, in which no surface treatment was conducted for the positive electrode active material particles, showed a high-rate capability of 74.3%. On the other hand, all the present invention cells A1-A4, B, C1-C3, D1-D4, E1, E2, F1, and F2, in which the surface treatment was conducted for the positive electrode active material particles, exhibited greater high-rate capability than the comparative cell Z, from 74.8% to 83.8%. In addition, the comparative cell Z showed an initial discharge atoms exist between the octahedrons shown in FIGS. 3 and 4. (S. J. Hwang et al., Electrochem. Solid-State Lett. 4, p. A213 (2001).) In each of the present invention cells A1-A4, B, C1-C3, E1, E2, F1, and F2, a protective layer 4 comprising Li$_3$PO$_4$ or the like is formed on the active material particle surface, as illustrated in FIG. 2. On the other hand, in the present invention cells D1-D4, no protective layer is formed on the active material particle surface, as illustrated in FIG. 1.

Also as is clear from Table 1, the optimum range of the proportion of the first reducing agent varies depending of the kind of the first reducing agent. For example, when the first reducing agent is a phosphate salt [$NH_4H_2PO_4$, $H_3PO_4$, or ($NH_4)_2HPO_4$], it is desirable that the amount be from 1 mass % to 5 mass % (cf. the present invention cells A1-A4, B, and C1-C3). If the proportion of the phosphate salt is less than 1 mass %, the surface adjacent portion of the positive electrode active material particle does not change into the spinel structure sufficiently, so the high-rate capability cannot be improved sufficiently. On the other hand, if the proportion of the phosphate salt exceeds 5 mass %, the amount of the $Li_3PO_4$ formed on the positive electrode active material surface is too large, and the protective layer becomes too thick, causing the initial discharge capacity to decrease. For the same reasons, when the first reducing agent is diammonium citrate or ascorbic acid, it is desirable that the proportion thereof be 1 mass % to 10 mass % (cf. the present invention cells E1, E2, F1, and F2).

Moreover, when the first reducing agent is a sulfate [($NH_4)_2\ SO_4$], it is desirable that the proportion thereof be 1 mass % to 20 mass % (cf. the present invention cells D1 to D4). The lower limit is set for the same reason as in the case of the phosphate salt, but the upper limit is set for a reason specific to sulfates. That is, the proportion of the sulfate is restricted to 20 mass % or less because, although the problem associated with the excessively thick protective layer as in the case of the phosphate salt does not arise, the portion having the layered structure becomes too small when the amount of the first reducing agent exceeds 20 mass %, leading to the problems that the discharge potential decreases and that the initial charge-discharge efficiency exceeds 100%.

Cycle Performance

As clearly seen from Table 1, the present invention cells D1 to D4 using ($NH_4)_2SO_4$ as the first reducing agent showed lower cycle performance than the present invention cells A1-A4. The reason is as follows. In the present invention cells A1-A4, $Li_3PO_4$ is produced on the surface of the positive electrode active material particle as a residue (i.e., as illustrated in FIG. 2, the protective layer 4 comprising $Li_3PO_4$ or the like is formed on the surface), and this serves to protect the positive electrode active material particle. This prevents the transition metal atoms from dissolving away from the positive electrode active material particle and prevents the electrolyte solution from decomposition. Therefore, the cycle performance is improved. On the other hand, in the present invention cells D1 to D4, no protective layer is formed on the surface of the positive electrode active material particle as shown in FIG. 1. For this reason, the transition metal atoms may dissolve away from the positive electrode active material or the electrolyte solution may decompose as the charge-discharge cycles are repeated. Consequently, the cycle performance becomes slightly lower. Nevertheless, even with the positive electrode active material particles of the present invention cells D1 to D4, the cycle performance can be improved by coating the surfaces of the positive electrode active material particles with $Al_2O_3$ or the like after the heat treatment with the first reducing agent.

Experiment 2

Each of the comparative cells Y1 to Y3 was charged and discharged to determine the initial discharge capacity, the initial charge-discharge efficiency, and the high-rate capability. The results are shown in Table 2 below. The charge-discharge conditions and the calculation methods for the initial charge-discharge efficiency and the high-rate capability were the same as described in Experiment 1 above. For comparison, the results for the present invention cells C1 to C3 are also shown in Table 2.

TABLE 2

| Cell | Composition of positive electrode active material | First reducing agent Type | Proportion (%) | Additive Type | Proportion (%) | Initial discharge capacity (mAh/g) | Initial charge-discharge efficiency (%) | High-rate capability (%) |
|---|---|---|---|---|---|---|---|---|
| C1 | $Li_{1.20}Mn_{0.54}Co_{0.13}Ni_{0.13}O_2$ | ($NH_4)_2HPO_4$ | 2 | — | — | 255.6 | 82.7 | 75.4 |
| C2 | | | 5 | — | — | 249.0 | 83.0 | 76.7 |
| C3 | | | 10 | — | — | 242.7 | 89.2 | 75.5 |
| Y1 | | | 2 | $LiOH\cdot H_2O$ | 1.9 | 248.0 | 77.9 | 74.5 |
| Y2 | | | 5 | $LiOH\cdot H_2O$ | 4.8 | 232.4 | 75.6 | 73.0 |
| Y3 | | | 10 | $LiOH\cdot H_2O$ | 9.5 | 218.8 | 76.6 | 69.6 |

The results shown in Table 2 clearly demonstrate that, when the cells having the same concentration of the first reducing agent are compared with each other among the present invention cells C1 to C3 and the comparative cells Y1 to Y3 (for example, when the present invention cell C1 is compared with the comparative cell Y1), the present invention cells C1 to C3 exhibit better high-rate capability and better initial charge-discharge efficiency and moreover show higher initial discharge capacity than the comparative cells Y1 to Y3. The present invention cells C1 to C3 exhibit better battery characteristics than the comparative cells Y1 to Y3 although both are treated with ($NH_4)_2HPO_4$. The reason is believed to be as follows.

As discussed previously, when the ($NH_4)_2HPO_4$ is decomposed, lithium and oxygen are extracted from the positive electrode active material and the spinel layer is formed on the surface of the positive electrode active material particle in the present invention cells C1 to C3. On the other hand, in the comparative cells Y1 to Y3, the LiOH reacts with the ($NH_4)_2HPO_4$, forming a layer of $Li_3PO_4$ on the particle surface because 3 moles of LiOH is added per 1 mole of ($NH_4)_2HPO_4$. As a consequence, no spinel layer is formed on the surface of the positive electrode active material particle. Accordingly, it will be evident that, in order to improve the high-rate capability and so forth of the positive electrode active material, it is necessary to provide a spinel layer on the surface of the positive electrode active material.

Experiment 3

The comparative cell X was charged and discharged to determine the initial discharge capacity and the initial charge-discharge efficiency. The results are shown in Table 3 below. The charge-discharge conditions and the calculation method for the initial charge-discharge efficiency were the same as described in Experiment 1 above. For comparison, the results for the present invention cell A4 are also shown in Table 3.

TABLE 3

| Cell | Composition of positive electrode active material | First reducing agent Type | First reducing agent Proportion (%) | Heat-treating temperature (° C.) | Initial discharge capacity (mAh/g) | Initial charge-discharge efficiency (%) | High-rate capability (%) |
|---|---|---|---|---|---|---|---|
| A4 | $Li_{1.20}Mn_{0.54}Co_{0.13}Ni_{0.13}O_2$ | $NH_4H_2PO_4$ | 10 | 300 | 235.9 | 93.9 | 74.8 |
| X | | | | 700 | 152.1 | 76.7 | 62.9 |

As clearly seen from Table 3, the present invention cell A4 exhibits a better initial charge-discharge efficiency and a greater initial discharge capacity than the comparative cell X. Thus, it will be evident that the advantageous effects of the present invention cannot be obtained when the heat-treating temperature is elevated excessively. This is believed to be because elevating the heat-treating temperature excessively can facilitate oxygen absorption into the positive electrode active material particles. The optimum temperature range will be discussed in the later-described experiment 5.

Experiment 4

The comparative cell W was charged and discharged to determine the initial discharge capacity and the initial charge-discharge efficiency. The results are shown in Table 4 below. The charge-discharge conditions and the calculation method for the initial charge-discharge efficiency were the same as described in Experiment 1 above. For comparison, the results for the present invention cell D1 are also shown in Table 4.

% of $(NH_4)_2HPO_4$ (used in the present invention cell C3) and 10 mass % of $(NH_4)_2SO_4$ (used in the present invention cell D3) as the first reducing agent, the experiment was performed by conducting TGA (thermogravimetric analysis) for the respective positive electrode active material particles. Specifically, the mass change was determined while the temperature was elevated at a rate of 5° C./min.

Figure 5:
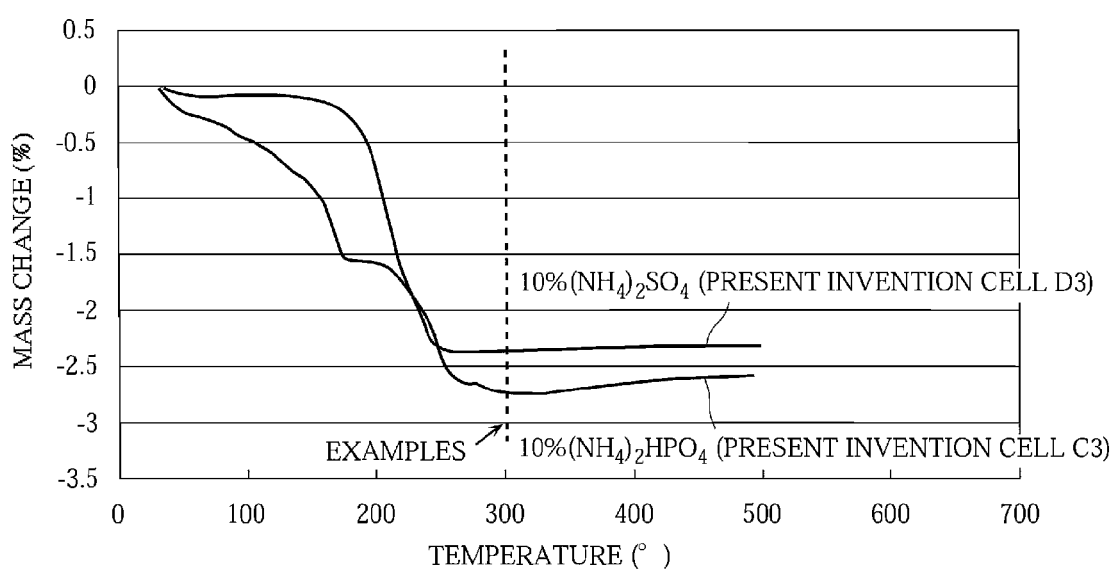
FIG. 5 is a graph illustrating the results of TGA (thermogravimetric analysis) for the positive electrode active material particles subjected to the treatment of the first step using 10% $(NH_4)_2HPO_4$ as the first reducing agent and the positive electrode active material particles subjected to the treatment of the first step using 10% $(NH_4)_2SO_4$ as the first reducing agent.

As clearly seen from FIG. 5, the mass greatly changed at 200° C. or higher for both examples. Therefore, it is evident that a temperature of 200° C. or higher is necessary to cause the reaction, and a temperature of 250° C. or higher is particularly desirable. Although not shown in FIG. 5, a temperature higher than 500° C. facilitates oxygen absorption into the positive electrode active material particle, deteriorating the discharge capacity considerably. Therefore, it is necessary that the heat-treating temperature be 500° C. or lower, and it is desirable that the heat-treating temperature be 400° C. or lower. For these reasons, in the present invention, it is neces-

TABLE 4

| Cell | Positive electrode active material | First reducing agent Type | First reducing agent Proportion (%) | First reducing agent Method of addition | Heat-treating temperature (° C.) | Water washing | Initial discharge capacity (mAh/g) | Initial charge-discharge efficiency (%) | High-rate capability (%) |
|---|---|---|---|---|---|---|---|---|---|
| D1 | $Li_{1.20}Mn_{0.54}Co_{0.13}Ni_{0.13}O_2$ | $(NH_4)_2SO_4$ | 2 | Liquid | 300 | Yes | 261.1 | 80.9% | 76.7 |
| W | | | | Solid | 700 | No | 238.2 | 77.3% | 74.2 |

The comparative cell W, in which the positive electrode active material was prepared in the same method shown in the previously-mentioned Japanese Published Unexamined Patent Application No. 2009-146739 (although the positive electrode active material in Japanese Published Unexamined Patent Application No. 2009-146739 is nickel-based one), showed a poorer initial charge-discharge efficiency and a lower initial discharge capacity than the present invention cell D1. This demonstrates that the battery characteristics cannot be improved even when the surface treatment method that is desirable for a nickel-based positive electrode active material (stated simply, the method in which the positive electrode active material and $(NH_4)_2SO_4$ are dry-blended and thereafter heat-treated at 700° C.) is applied simply to a manganese-based positive electrode active material.

Experiment 5

Taking the results obtained in Experiments 3 and 4 into consideration, the optimum range of the heat-treating temperature in the present invention was studied. Using 10 mass sary that the heat-treating temperature be within the range of from 200° C. to 500° C., and more desirably within the range of from 250° C. to 400° C.

Experiment 6

Figure 6:
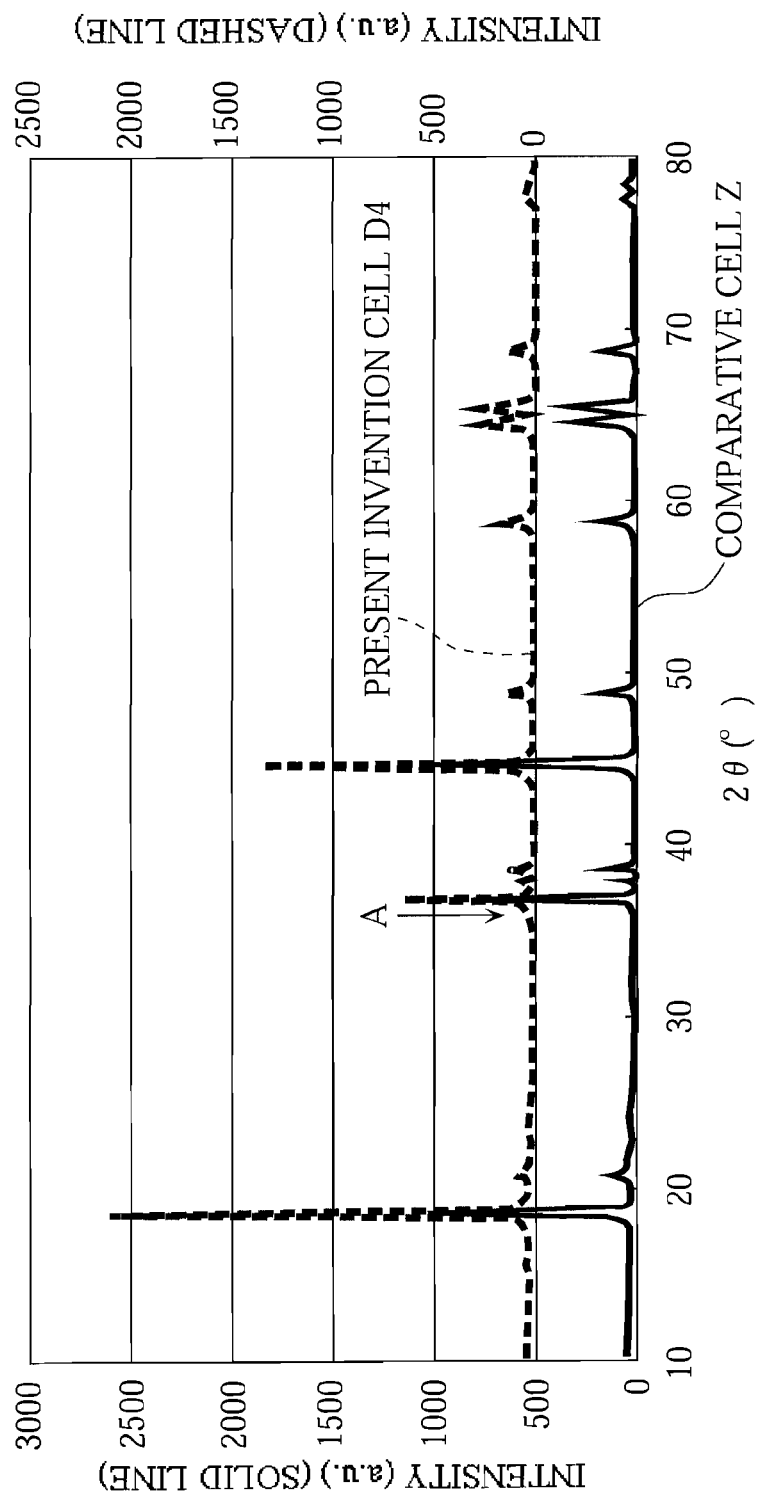
FIG. 6 is a graph illustrating XRD measurement results for the positive electrode active material particles used for the present invention cell D4 and the positive electrode active material particles used for the comparative cell Z.

The positive electrode active material particles used for the present invention cell D4 and the positive electrode active material particles used for the comparative cell Z were subjected to an XRD measurement (using a CuKα radiation source and the measurement range 2θ=10° to 80°. The XRD patterns obtained are shown in FIG. 6.

The present invention cell D4 shows a peak at around 36.7° (see the arrow A in FIG. 6), while the comparative cell Z shows no peak at around 36.7°. This indicates that a spinel portion exists in the present invention cell D4. However, because the spinel portion exists only in the surface adjacent portion of the particle, the peak intensity at around 36.7° is not very high.

Here, lattice constants were calculated from the XRD patterns to analyze the structures of the inner portions of the positive electrode active material particles. Table 5 below shows the results obtained by fitting the peak positions to the space group R3-m structure. As is clear from Table 5, the lattice constants of the positive electrode active material particles used for the present invention cell D2, D3, D4 and those used for the comparative cell Z are the same. Therefore, it is demonstrated that the inner portion of the positive electrode active material particle is not affected by the treatment with the first reducing agent (i.e., the inner portion of the positive electrode active material particle has a layered structure).

TABLE 5

| Cell | a-axis (Å) | c-axis (Å) |
|---|---|---|
| D2 | 2.8529 | 14.245 |
| D3 | 2.8530 | 14.246 |
| D4 | 2.8535 | 14.248 |
| Z | 2.8533 | 14.238 |

Experiment 7

The positive electrode active material particles used for the present invention cells D2 to D4 and the positive electrode active material particles used for the comparative cell Z were subjected to Raman spectroscopy. The results are shown in Table 6 below. Raman spectroscopy is a method of analysis in which a laser beam is applied to a substance and the resulting scattered light is observed by a spectroscope, whereby the surface conditions of the active material can be confirmed. It is demonstrated that the surface conditions of the active material particle are changed by the treatment with the first reducing agent. The peak at 605 cm$^{-1}$ [hereinafter also referred to as I(605)] originates from a layered structure, and the peak at 635 cm$^{-1}$ peak [hereinafter also referred to as I(635)] originates from a spinel structure. The ratio of the layered structure and the spinel structure can be found from the Raman intensity ratio.

The results shown in Table 6 clearly show that the present invention cells D2 to D4, for which the treatment with the first reducing agent was performed, exhibited higher Raman intensity ratios [I(635)/I(605)] than the comparative cell Z, for which the treatment with the first reducing agent was not performed. It is also observed that the greater the proportion of the first reducing agent is, the higher the Raman intensity ratio (D4>D3>D2). Thus, it is proved that the spinel structure exists in the surface part of the active material particle in each of the present invention cells D2 to D4. In addition, it is observed that the greater the proportion of the first reducing agent is, the greater the proportion of the spinel structure. According to a study conducted by the present inventors, it was found that the proportion of the layered structure and the spinel structure was optimum when the Raman intensity ratio was in the range 0.6<I(635)/I(605)<1.5.

TABLE 6

| Cell | I(605) | I(635) | I(635)/I(605) |
|---|---|---|---|
| D2 | 149 | 91 | 0.61 |
| D3 | 106 | 83 | 0.78 |
| D4 | 78 | 83 | 1.06 |
| Z | 196 | 109 | 0.56 |

Experiment 8

Figure 7:
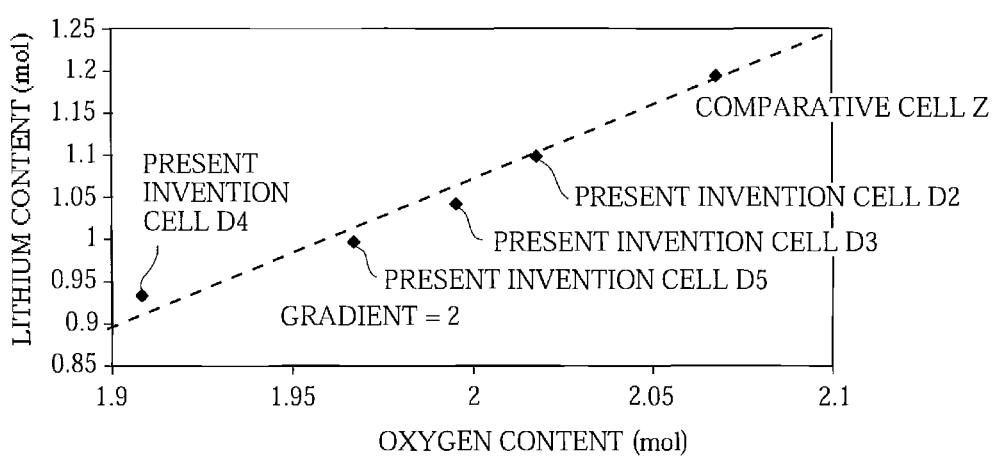
FIG. 7 is a graph illustrating the relationship between oxygen content and lithium content in the present invention cells D2 to D5 and the comparative cell Z.

The positive electrode active material particles used for the present invention cells D2 to D5 and the positive electrode active material particles used for the comparative cell Z were subjected to an elementary analysis using an inductively coupled plasma (ICP) method. The results are shown in FIG. 7. The amount of oxygen was calculated by subtracting the amount of lithium and the amount of the transition metals that were obtained by the ICP spectroscopy from the total amount of the positive electrode active material used in the ICP spectroscopy. It is clear from FIG. 7 that lithium and oxygen are extracted from the positive electrode active material the treatment with the first reducing agent in a mole ratio of 2:1.

Table 7 below shows the proportions of the amount of lithium, the amount of transition metals, and the amount of oxygen in the positive electrode active material particles used for the present invention cells D2 to D4 and the positive electrode active material particles used for the comparative cell Z. The ratio of the oxygen and the transition metals in the positive electrode active material particles used for the comparative cell Z (the positive electrode active material being entirely in a layered structure and having not spinel structure) is 2.58 to 1. Theoretically, the ratio of oxygen and transition metals in a spinel structure is 2 to 1. Thus, it is evident that a spinel structure exists in the positive electrode active material of each of the present invention cells D2 to D4, in which the oxygen/transition metal ratio is decreased by the treatment with the first reducing agent.

TABLE 7

| Cell | Lithium | Transition metal | Oxygen | Oxygen/Transition metal |
|---|---|---|---|---|
| D2 | 1.110 | 0.800 | 2.020 | 2.53 |
| D3 | 1.043 | 0.800 | 1.994 | 2.49 |
| D4 | 0.933 | 0.800 | 1.910 | 2.39 |
| Z | 1.197 | 0.800 | 2.067 | 2.58 |

Experiment 9

In order to clearly show the difference between the present invention and the invention shown in the previously-mentioned Electrochemical and Solid-State Letters 9(5), A221-A224, (2006) (i.e., a method of acid treating a lithium-excess lithium-transition metal composite oxide for modifying the active material surface, which aims at improving the first cycle performance of the active material by removing excess lithium from the active material), a cyclic voltammetry analysis was conducted for the positive electrode active material particles used for the present invention cell D3 and those used for the comparative cell V. The results are shown in FIG. 8.

Figure 8:
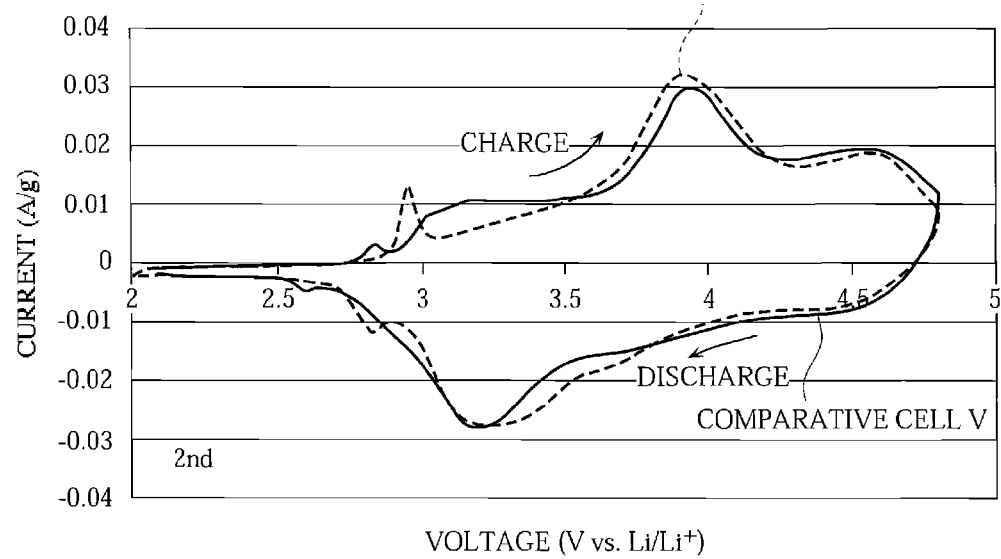
FIG. 8 is a graph illustrating the results of the cyclic voltammetry for the positive electrode active material particles used for the present invention cell D3 and the positive electrode active material particles used for the comparative cell V.

As clearly seen from FIG. 8, when comparing the two profiles, the oxidation/reduction peaks are clearly different between 2.5 V and 3.0 V (vs. Li/Li$^+$), so it is evident that these two positive electrode active materials are different from each other. The reason is believed to be as follows. In the positive electrode active material used for the comparative cell V, the hydrogen ions originating from the solution are exchanged with the lithium ions in the active material during the acid treatment, and thereafter, absorbed water is removed by annealing. In contrast, in the positive electrode active material used for the present invention cell D3, the hydrogen ions do not enter the active material.

Additionally, the first reducing agent [$(NH_4)_2HPO_4$] used for the present invention cell C3 in preparing the positive electrode active material has a pH of 8.1, and it is not acidic. Therefore, acidic conditions are not essential for forming the spinel layer as described in the present invention.

Second Group of Examples

Examples G1 to G3

Cells were fabricated in the same manners as described in Examples D1 to D3 of the First Group of Examples, except that $Li_{1.16}Mn_{0.5}Co_{0.17}Ni_{0.17}O_2$ was used as the lithium-excess lithium-transition metal composite oxide.

The cells fabricated in these manners are hereinafter referred to as present invention cells G1 to G3, respectively.

Comparative Example U

A cell was fabricated in the same manner as described in Comparative Example Z of the First Group of Examples, except that $Li_{1.16}Mn_{0.5}Co_{0.17}Ni_{0.17}O_2$ was used as the lithium-excess lithium-transition metal composite oxide.

The cell fabricated in this manner is hereinafter referred to as a comparative cell U.

Experiment

Each of the present invention cells G1 to G3 and the comparative cell U was charged and discharged to determine the initial discharge capacity, the initial charge-discharge efficiency, and the high-rate capability. The results are shown in Table 8 below. The charge-discharge conditions and the calculation methods for the initial charge-discharge efficiency and the high-rate capability were the same as described in Experiment 1 in the foregoing First Group of Examples.

As clearly seen from Table 8, the present invention cells G1 to G3 exhibited higher initial discharge capacity, higher initial charge-discharge efficiency, and greater high-rate capability than the comparative cell U.

Third Group of Examples

Examples H1 to H3

Cells were fabricated in the same manners as described in Examples D1 to D3 of the First Group of Examples, except that $Li_{1.13}Mn_{0.47}Co_{0.2}Ni_{0.2}O_2$ was used as the lithium-excess lithium-transition metal composite oxide.

The cells fabricated in these manners are hereinafter referred to as present invention cells H1 to H3, respectively.

Comparative Example T

A cell was fabricated in the same manner as described in Comparative Example Z in the First Group of Examples, except that $Li_{1.13}Mn_{0.47}Co_{0.2}Ni_{0.2}O_2$ was used as the lithium-excess lithium-transition metal composite oxide.

The cell fabricated in this manner is hereinafter referred to as a comparative cell T.

Experiment

Each of the present invention cells H1 to H3 and the comparative cell T was charged and discharged to determine the initial discharge capacity, the initial charge-discharge efficiency, and the high-rate capability. The results are shown in Table 9 below. The charge-discharge conditions and the calculation methods for the initial charge-discharge efficiency and the high-rate capability were the same as described in Experiment 1 in the foregoing First Group of Examples.

TABLE 8

| Cell | Positive electrode active material | First reducing agent Type | Proportion (%) | Initial discharge capacity (mAh/g) | Initial charge-discharge efficiency (%) | High-rate capability (%) |
|---|---|---|---|---|---|---|
| G1 | $Li_{1.16}Mn_{0.5}Co_{0.17}Ni_{0.17}O_2$ | $(NH_4)_2SO_4$ | 2 | 228.1 | 80.9 | 76.3 |
| G2 | | | 5 | 234.6 | 81.5 | 78.2 |
| G3 | | | 10 | 246.2 | 88.4 | 80.2 |
| U | | — | | 215.3 | 74.1 | 73.7 |

TABLE 9

| Cell | Positive electrode active material | First reducing agent Type | Proportion (%) | Initial discharge capacity (mAh/g) | Initial charge-discharge efficiency (%) | High-rate capability (%) |
|---|---|---|---|---|---|---|
| H1 | $Li_{1.13}Mn_{0.47}Co_{0.2}Ni_{0.2}O_2$ | $(NH_4)_2SO_4$ | 2 | 226.3 | 82.4 | 78.4 |
| H2 | | | 5 | 224.7 | 84.2 | 80.1 |
| H3 | | | 10 | 226.7 | 87.7 | 81.4 |
| T | | — | | 216.3 | 79.6 | 76.5 |

As clearly seen from Table 9, the present invention cells H1 to H3 exhibited higher initial discharge capacity, higher initial charge-discharge efficiency, and greater high-rate capability than the comparative cell T.

Fourth Group of Examples

Example I1

A cells was fabricated in the same manner as described in Example D3 in the First Group of Examples, except that, after the second step (the heat-treating step), 2 mass % of $(NH_4)_2HPO_4$ as a second reducing agent was caused to adhere to the composite oxide particles and then dried at 80° C., and thereafter, a heat treatment was conducted at 300° C. for 5 hours (the third step).

The cell fabricated in this manner is hereinafter referred to as a present invention cell I1.

Example I2

A cell was fabricated in the same manner as described in Example I1 above, except that 2 mass % of $H_3BO_3$ was used as the second reducing agent.

The cell fabricated in this manner is hereinafter referred to as a present invention cell I2.

Examples J1 and J2

Cells were fabricated in the same manners as described in Example D3 in the First Group of Examples and the above-described Example I1, except that a substance in which $Li_{1.20}Mn_{0.54}Co_{0.13}Ni_{0.13}O_2$ is doped with 0.5% Mg (i.e., $Li_{1.20}Mn_{0.53}Co_{0.13}Ni_{0.13}Mg_{0.01}O_2$) was used as the lithium-excess lithium-transition metal composite oxide.

The cells fabricated in these manners are hereinafter referred to as present invention cells J1 and J2, respectively.

Examples K1 to K3

Cells were fabricated in the same manners as described in Example D3 in the First Group of Examples and the above-described Examples I1 and I2, except that a substance in which $Li_{1.20}Mn_{0.54}Co_{0.13}Ni_{0.13}O_2$ is doped with 0.5% Zr (i.e., $Li_{1.20}Mn_{0.53}Co_{0.13}Ni_{0.13}Zr_{0.01}O_2$) was used as the lithium-excess lithium-transition metal composite oxide.

The cells fabricated in these manners are hereinafter referred to as present invention cells K1 to K3, respectively.

Examples L1 and L2

Cells were fabricated in the same manners as described in Example D3 in the First Group of Examples and the above-described Example I1, except that a substance in which $Li_{1.20}Mn_{0.54}Co_{0.13}Ni_{0.13}O_2$ is doped with 0.5% Nb (i.e., $Li_{1.20}Mn_{0.53}Co_{0.13}Ni_{0.13}Nb_{0.01}O_2$) was used as the lithium-excess lithium-transition metal composite oxide.

The cells fabricated in these manners are hereinafter referred to as present invention cells L1 and L2, respectively.

Comparative Examples S, R, and Q

Cells were fabricated in the same manner as described in Comparative Example Z of the First Group of Examples, except that $Li_{1.20}Mn_{0.53}Co_{0.13}Ni_{0.13}Mg_{0.01}O_2$, $Li_{1.20}Mn_{0.53}Co_{0.13}Ni_{0.13}Zr_{0.01}O_2$, and $Li_{1.20}Mn_{0.53}Co_{0.13}Ni_{0.13}Nb_{0.01}O_2$, respectively, were used as the lithium-excess lithium-transition metal composite oxide.

The cells fabricated in these manners are hereinafter referred to as comparative cells S, R, and Q, respectively.

Experiment

Each of the present invention cells I1, I2, J1, J2, K1-K3, L1, and L2 as well as the comparatives cells S, R, and Q was charged and discharged to determine the initial discharge capacity, the initial charge-discharge efficiency, the high-rate capability, and the cycle performance. The results are shown in Table 10 below. The charge-discharge conditions and the calculation methods for the initial charge-discharge efficiency and the high-rate capability were the same as described in Experiment 1 in the foregoing First Group of Examples.

TABLE 10

| Cell | Composition of positive electrode active material | First reducing agent Type | First reducing agent Proportion (%) | Second reducing agent Type | Second reducing agent Proportion (%) | Initial discharge capacity (mAh/g) | Initial charge-discharge efficiency (%) | High-rate capability (%) | Cycle performance (%) |
|---|---|---|---|---|---|---|---|---|---|
| D3 | $Li_{1.20}Mn_{0.54}Co_{0.13}Ni_{0.13}O_2$ | $(NH_4)_2SO_4$ | 10 | — | — | 267.8 | 85.5 | 81.6 | 89.3 |
| I1 | | | 10 | $(NH_4)_2HPO_4$ | 2 | 261.7 | 92.2 | 76.9 | 87.9 |
| I2 | | | 10 | $H_3BO_3$ | 2 | 271.6 | 89.6 | 78.6 | 88.4 |
| Z | | — | — | — | — | 242.6 | 75.9 | 74.3 | 79.4 |
| J1 | $Li_{1.20}Mn_{0.53}Co_{0.13}Ni_{0.13}Mg_{0.01}O_2$ | $(NH_4)_2SO_4$ | 10 | — | — | 270.2 | 88.6 | 82.6 | 51.4 |
| J2 | | | 10 | $(NH_4)_2HPO_4$ | 2 | 264.1 | 93.4 | 78.7 | 92.3 |
| S | | — | — | — | — | 256.8 | 77.5 | 77.0 | 73.6 |
| K1 | $Li_{1.20}Mn_{0.53}Co_{0.13}Ni_{0.13}Zr_{0.01}O_2$ | $(NH_4)_2SO_4$ | 10 | — | — | 275.4 | 88.8 | 82.9 | 50.0 |
| K2 | | | 10 | $(NH_4)_2HPO_4$ | 2 | 266.2 | 93.1 | 79.2 | 93.4 |
| K3 | | | 10 | $H_3BO_3$ | 2 | 271.7 | 87.1 | 80.8 | 76.7 |
| R | | — | — | — | — | 262.4 | 78.2 | 77.3 | 76.0 |
| L1 | $Li_{1.20}Mn_{0.53}Co_{0.13}Ni_{0.13}Nb_{0.01}O_2$ | $(NH_4)_2SO_4$ | 10 | — | — | 270.2 | 89.7 | 80.5 | 76.7 |
| L2 | | | 10 | $(NH_4)_2HPO_4$ | 2 | 262.9 | 94.7 | 77.5 | 88.9 |
| Q | | — | — | — | — | 266.3 | 79.8 | 75.9 | 71.2 |

(1) In the Case of Using a Positive Electrode Active Material not Doped with Mg, Zr, or Nb:

As clearly seen from Table 10, the present invention cell D3, for which the third step was not performed (i.e., the treatment with the second reducing agent was not performed), and the present invention cells I1 and I2, for which the third step was performed (i.e., the treatment with the second reducing agent was performed) exhibited higher initial discharge capacity, better initial charge-discharge efficiency, better high-rate capability, and higher cycle performance than the comparative cell Z. However, the present invention cells I1 and I2, for which the third step was performed, and the present invention cell D3, for which the third step was not performed, showed almost the same level of cycle performance.

(2) In the Case of Using a Positive Electrode Active Material Doped with Mg, Zr, or Nb:

As clearly seen from Table 10, the present invention cells J1, K1, and L1, for which the third step was not performed, and the present invention cells J2, K2, K3, and L2, for which the third step was performed, exhibited higher initial discharge capacity, better initial charge-discharge efficiency, and better high-rate capability than the comparative cells S, R, and Q, for which the third step was performed. However, the present invention cells J1, K1, and L1, for which the third step was not performed, showed lower cycle performance than the comparative cells S, R, and Q. On the other hand, the present invention cells J2, K2, K3, and L2, for which the third step was performed, exhibited higher cycle performance than the comparative cells S, R, and Q. The reason is believed to be that a protective layer was formed on the positive electrode active material surface by performing the treatment with the second reducing agent, and thereby, the transition metal atoms were prevented from dissolving away from the positive electrode active material.

Other Embodiments (1) The first reducing agent used in the first step is not limited to the above-mentioned substances such as $NH_4H_2PO_4$. It is also possible to use an ammonium-based compound other than the above-mentioned $(NH_4)_2HPO_4$, such as $NH_4NO_3$, $NH_4HCO_3$, and $NH_4Cl$. It is also possible to use an organic acid such as lactic acid, formic acid, acetic acid, citric acid, and oxalic acid. Moreover, it is possible to use a combination of two or more reducing agents as the first reducing agent. Furthermore, it is possible to perform a heat treatment using a reducing agent and thereafter perform another heat treatment using another reducing agent (i.e., to perform the surface treatment a plurality of times).

(2) The BET specific surface area and the particle size of the lithium-excess lithium-transition metal composite oxide particles are not limited. The present invention can be applied to lithium-excess lithium-transition metal composite oxide particles of any BET specific surface area or any particle size.

(3) The solvent of the non-aqueous electrolyte used in the present invention is not limited to the above-mentioned EC or DEC. Usable examples include dimethyl carbonate (DMC), methyl ethyl carbonate (MEC), propylene carbonate (PC), fluoroethylene carbonate (FEC), and methyl 2,2,2-trifluoroethyl carbonate (FMEC). In addition, the electrolyte is not limited to the above-mentioned $LiPF_6$, and any electrolyte may be used, such as $LiAsF_6$, $LiBF_4$, and $LiCF_3SO_3$.

(4) A lithium-excess lithium-transition metal composite oxide doped with Nb, Zr, Mo, Ti, Mg, or the like may be used as the lithium-excess lithium-transition metal composite oxide in the present invention.

(5) In the first step in the present invention, the first reducing agent may be dry-blended with the lithium-excess lithium-transition metal composite oxide particles.

(6) The lithium-excess lithium-transition metal composite oxide particle may contain a structure belonging to the space group R3-m. In this case, a composite of the space group C2/m and the space group R3-m, or a composite of the space group C2/c and the space group R3-m, is formed.

(7) The second reducing agent used in the third step is not limited to the above-mentioned $NH_4H_2PO_4$ and $H_3BO_3$. It is also possible to use a compound such as $(NH_4)_2HPO_4$, $Al(OH)_3$, $Al(NO_3)$, $Mg(OH)_2$, $Ti(OCH_3)_4$, and $Zr(OC_2H_5)_4$. In addition, the method of forming the protective layer is not limited to the method using the second reducing agent. It is possible to use a method in which a protective layer is formed on the positive electrode active material surface mechanically.

The present invention may be applicable to, for example, power sources for mobile information terminals such as mobile telephones, notebook computers, and PDAs.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A positive electrode active material comprising:
a lithium-excess lithium-transition metal composite oxide particle represented by the chemical formula $Li_{1+x-s}Mn_{1-x-y}M_yO_{2-t}$, where $0<x<0.33$, $0<y<0.66$, $0<s<0.3$, $0<t<0.15$, and M is at least one transition metal other than manganese; and
the lithium-excess lithium-transition metal composite oxide particle comprising an inner portion having a layered structure and a surface adjacent portion having a crystal structure changing from a layered structure to a spinel structure from an inner part thereof toward a surface part thereof, and the layered structure and the spinel structure having an identical ratio of the Mn and the M in the chemical formula.

2. The positive electrode active material according to claim 1, wherein the lithium-excess lithium-transition metal composite oxide particle is represented by the chemical formula $Li_{1+x-s}Mn_{1-x-p-q}Ni_pCo_qA_rO_{2-t}$, where $0<x<0.33$, $0<p<0.5$, $0<q<0.33$, $0\le r<0.05$, $0<s<0.3$, $0<t<0.15$, and A is Mg, Zr, or Nb.

3. The positive electrode active material according to claim 1, wherein the lithium-excess lithium-transition metal composite oxide particle has a Raman intensity ratio $[I(635)/I(605)]$ in the range $0.6<I(635)/I(605)<1.5$.

4. The positive electrode active material according to claim 1, wherein the inner portion having a layered structure contains at least a structure belonging to the space group C2/m or C2/c.

5. The positive electrode active material according to claim 1, further comprising a protective layer formed on the surface of the lithium-excess lithium-transition metal composite oxide particle.

6. A non-aqueous electrolyte secondary battery comprising a negative electrode, a non-aqueous electrolyte, and a positive electrode containing a positive electrode active material according to claim 1.

* * * * *